United States Patent
Tomkiewicz et al.

(10) Patent No.: US 11,989,875 B2
(45) Date of Patent: May 21, 2024

(54) AUTOMATED MANUFACTURING CELL

(71) Applicant: Plastic Components, Inc., Germantown, WI (US)

(72) Inventors: Steve Tomkiewicz, Saukville, WI (US); Kurt Behrendt, Germantown, WI (US); Kevin Desotell, Pewaukee, WI (US)

( * ) Notice: Subject to any disclaimer, the term of this patent is extended or adjusted under 35 U.S.C. 154(b) by 0 days.

(21) Appl. No.: 17/662,386

(22) Filed: May 6, 2022

(65) Prior Publication Data
US 2022/0358629 A1    Nov. 10, 2022

Related U.S. Application Data

(60) Provisional application No. 63/184,981, filed on May 6, 2021.

(51) Int. Cl.
| | |
|---|---|
| *G06T 7/00* | (2017.01) |
| *B29C 45/14* | (2006.01) |
| *B29C 45/76* | (2006.01) |
| *G01B 11/245* | (2006.01) |
| *G06T 7/70* | (2017.01) |
| *H04N 23/74* | (2023.01) |
| *B29C 45/16* | (2006.01) |
| *B29K 705/00* | (2006.01) |

(52) U.S. Cl.
CPC ........ *G06T 7/001* (2013.01); *B29C 45/14008* (2013.01); *B29C 45/76* (2013.01); *G01B 11/245* (2013.01); *G06T 7/0008* (2013.01); *G06T 7/70* (2017.01); *H04N 23/74* (2023.01); *B29C 45/1671* (2013.01); *B29C 2945/76167* (2013.01); *B29C 2945/76294* (2013.01); *B29C 2945/76464* (2013.01); *B29K 2705/00* (2013.01); *G06T 2207/10152* (2013.01)

(58) Field of Classification Search
CPC .......... G06T 7/001; G06T 2207/10152; H04N 23/75
USPC .......................................................... 348/92
See application file for complete search history.

(56) References Cited

U.S. PATENT DOCUMENTS

| | | | |
|---|---|---|---|
| 2003/0035061 A1* | 2/2003 | Iwaki ..................... | G06T 17/10 |
| | | | 348/E5.029 |
| 2017/0136670 A1* | 5/2017 | Shiraishi ............... | B29C 45/768 |
| 2019/0251733 A1* | 8/2019 | Festa .................... | H04N 13/296 |

* cited by examiner

*Primary Examiner* — Amir Shahnami
(74) *Attorney, Agent, or Firm* — BENESCH, FRIEDLANDER, COPLAN & ARONOFF LLP

(57) ABSTRACT

Disclosed herein are systems and methods for efficiently and economically manufacturing molded polymer products such as those that require a two-shot, two-material injection molding process, with complex geometries and incorporate metal components such as inserts. The systems and methods include compact manufacturing cells and processes of operating such manufacturing cells. The manufacturing cells include a single injection molding machine with two molds arranged to simultaneously operate both molds. The manufacturing cell is arranged to be fully automated so that it is operative without the need for intervention or management from dedicated personnel. Such automation includes the automated sorting and placement of metal inserts into the injection molding machine, the automated removal of the product after the first molding stage and second molding stage, the automated inspection of every finished product, the automated sorting of conforming and rejected products, and the automated packaging of finished product for shipment to end user.

9 Claims, 12 Drawing Sheets

Manufacturing Process Flow Chart

AUTOMATED MANUFACTURING CELL

CROSS REFERENCE TO RELATED APPLICATION

This Application claims priority to U.S. Provisional Patent Application Ser. No. 63/184,981, titled "Automated Manufacturing Cell," filed on May 6, 2021, which is expressly incorporated by reference herein in its entirety.

FIELD OF INVENTIONS

The present disclosure relates to the field of automated manufacturing cells. More particularly, the present disclosure relates to a system and method for arranging manufacturing equipment into an automated manufacturing cell to manufacture and inspect parts and components in a manner that provides the benefits of efficient use of labor and manufacturing facility real estate, reduction of capital expenses for manufacturing equipment, increase in quality of manufactured components, and consistent cycle times for repeated manufacturing processes.

BACKGROUND

In general, the manufacturing industry requires resource intensive operations. Typically, manufacturing operations require significant amounts of labor, physical space, equipment, and energy consumption. In an economically competitive environment, manufacturers continuously seek to reduce costs and improve quality in order to gain or maintain an economic edge over competitors. Since the dawn of the industrial revolution, automation has led the way in reducing costs by increasing productivity and quality and decreasing the need for labor. However, in the modern age, efficient use of physical space in manufacturing facilities has also led to substantial reductions in cost. Efficient use of floor space in a manufacturing facility leads to greater production capacity without the need and expense of expanding an existing manufacturing facility or building a new manufacturing facility.

The equipment required to manufacture a part or component is typically arranged into a manufacturing cell. Such manufacturing cells can be fairly self-contained, with direct access to raw materials, all equipment required to fabricate the raw materials into a part or component, equipment to perform finishing operations to form the final part or component, and the space, personnel and equipment necessary to perform an inspection to insure that each part or component meets predetermined quality standards. Such manufacturing cells are common in the injection molding industry. However, many current manufacturing cells remain labor intensive, inconsistent with regard to inspection and quality, and generally inefficient.

There continues to be a need in the manufacturing industry to reduce the reliance on labor, further automate manufacturing cells to improve consistency and quality through more accurate and precise inspection and reduce the overall size of manufacturing cells to shrink their footprints in manufacturing facilities. This is especially true for injection molding manufacturing cells. The systems, arrangements, and methods disclosed herein describe an innovative, efficient and reliable manufacturing cell useful to manufacture parts and components using injection molding processes.

SUMMARY

Disclosed herein are systems and methods for efficiently and economically manufacturing molded polymer products such as those that require a two-shot, two-material injection molding process, with complex geometries and incorporate metal components such as inserts. The systems and methods include compact and automated manufacturing cells and processes of operating such manufacturing cells. The manufacturing cells include a single injection molding machine with two molds arranged to simultaneously operate both molds. The manufacturing cell is arranged to be fully automated so that it is operative without the need for intervention or management from dedicated personnel. Such automation includes the automated sorting and placement of metal inserts into the injection molding machine, the automated removal of the product after the first molding stage and second molding stage, the automated inspection of every finished part or component, the automated sorting of conforming and rejected parts or components, and the automated packaging of finished product for shipment to end user. As compared to prior art manufacturing cells, the manufacturing cell disclosed herein results in substantial savings in labor costs; improvements in productivity with the elimination of variability in manufacturing cycle time; increase in quality by finding and removing non-conforming products from the manufacturing process; and space savings by arranging the manufacturing cell in a compact physical footprint.

BRIEF DESCRIPTION OF THE DRAWINGS

In the accompanying drawings, structures are illustrated that, together with the detailed description provided below, describe example embodiments of the claimed invention. Where appropriate, like elements are identified with the same or similar reference numerals. Elements shown as a single component can be replaced with multiple components. Elements shown as multiple components can be replaced with a single component. The drawings may not be to scale. The proportion of certain elements may be exaggerated for the purpose of illustration.

DETAILED DESCRIPTION

The apparatus, arrangements, and methods disclosed in this document are described in detail by way of examples and with reference to the figures. It will be appreciated that modifications to disclosed and described examples, arrangements, configurations, components, elements, apparatus, methods, materials, etc. can be made and may be desired for a specific application. In this disclosure, any identification of specific techniques, arrangements, methods, etc. are either related to a specific example presented or are merely a general description of such a technique, arrangement, method, etc. Identifications of specific details or examples are not intended to be and should not be construed as mandatory or limiting unless specifically designated as such. Selected examples of apparatus, arrangements, and methods for efficiently and economically manufacturing a complex component using a fully automated manufacturing operation are hereinafter disclosed and described in detail with reference made to FIGS. 1-12.

Generally, novel methods and systems disclosed herein are directed to automated manufacturing systems designed to manufacture a complex product in an economically efficient manner. More specifically, the novel methods and systems are directed to an automated manufacturing cell. The manufacturing cell described herein is arranged so that it is spatially compact, which results in the cell occupying a relatively small footprint on the manufacturing floor; reduces or eliminates the requirement for physical labor through automation; fully automates the handling of raw materials and sub-components required to manufacture the final product; automates the inspection process such that all final products are inspected; and minimizes and standardizes the cycle time required to manufacture the product.

The manufacturing cell and processes for manufacturing products using the manufacturing cell will be described in terms of manufacturing a specific product. However, it will be understood that the product disclosed herein is but one example of a product that can be manufactured by the manufacturing cell. It will be understood that the manufacturing cell can be used to manufacture a multitude of products based on the principles described herein.

Figure 1:
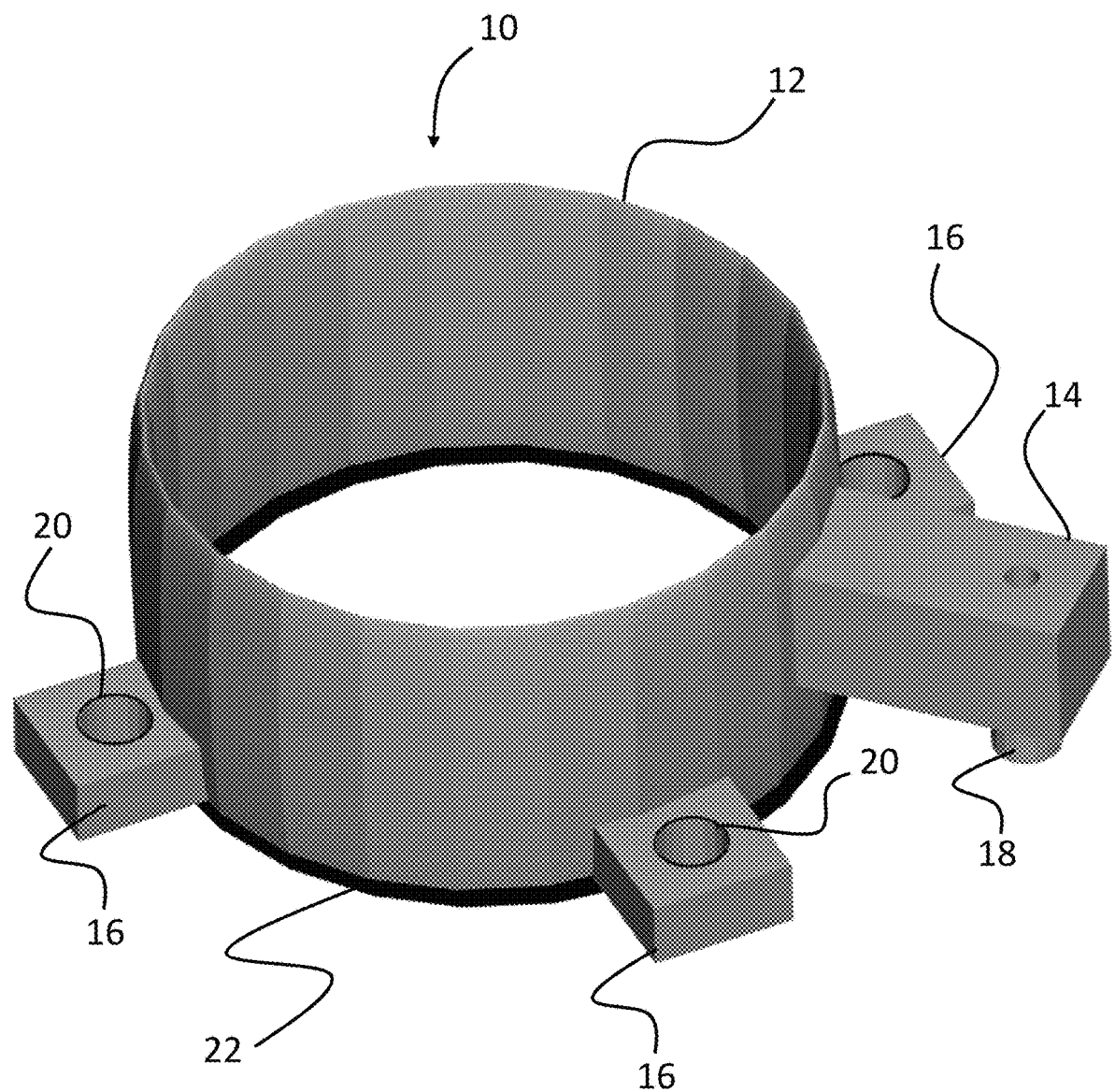
FIG. 1 schematically illustrates a perspective view of a sample product manufactured using the manufacturing cell described herein.
Figure 2:
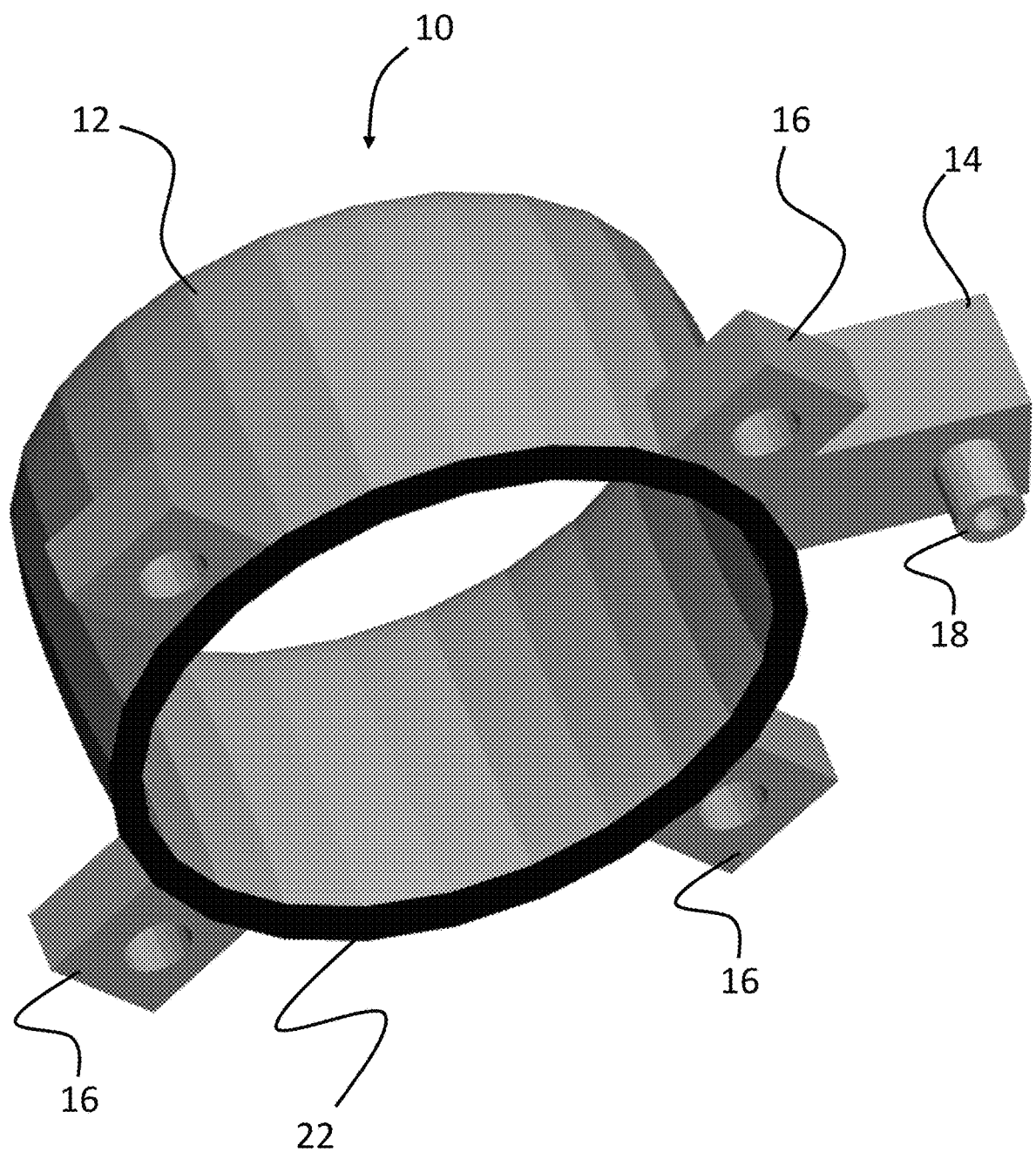
FIG. 2 schematically illustrates another perspective view of the sample product of FIG. 1.
Figure 3:
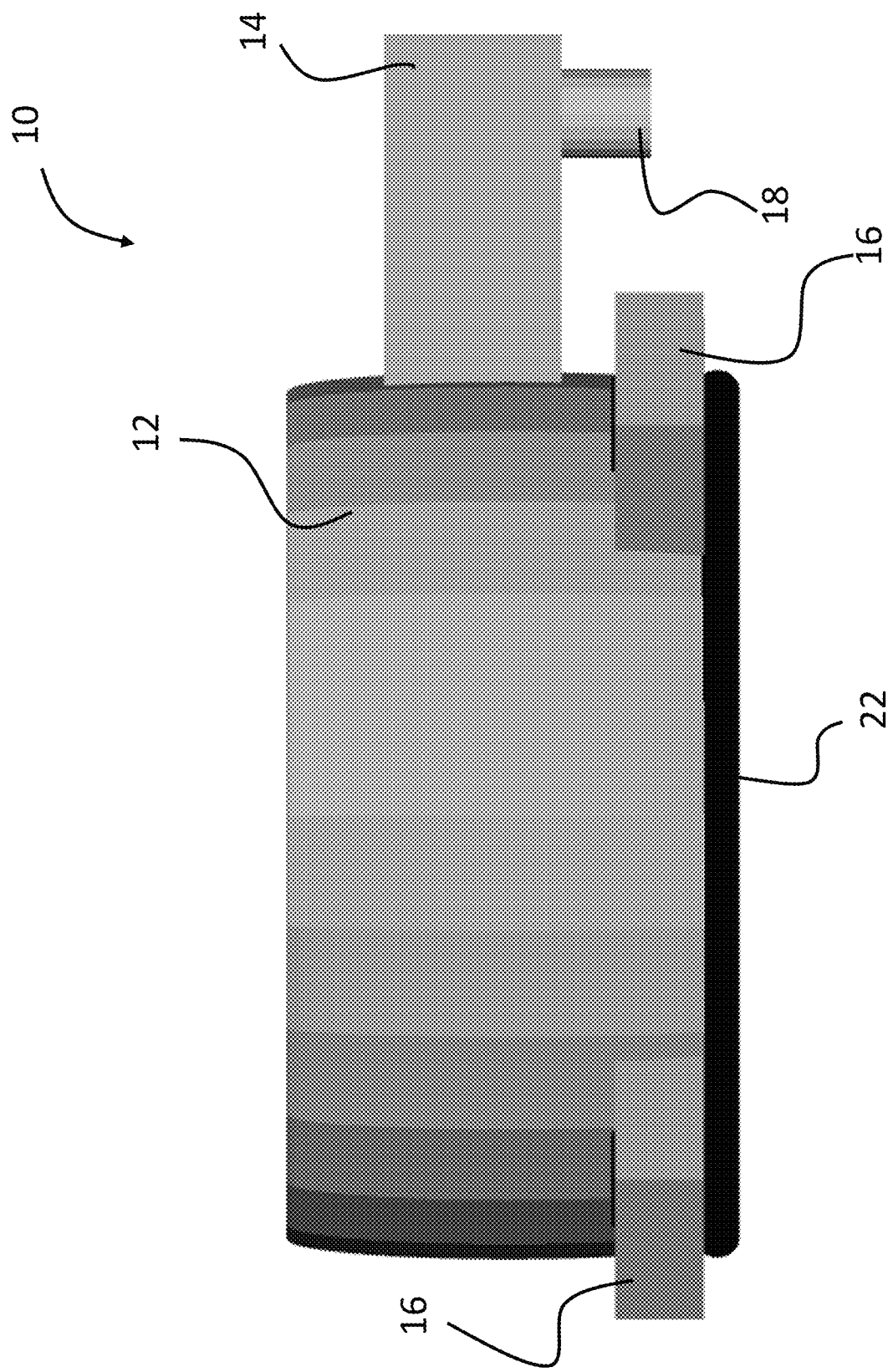
FIG. 3 schematically illustrates a plan view of the sample product of FIG. 1.
Figure 4:
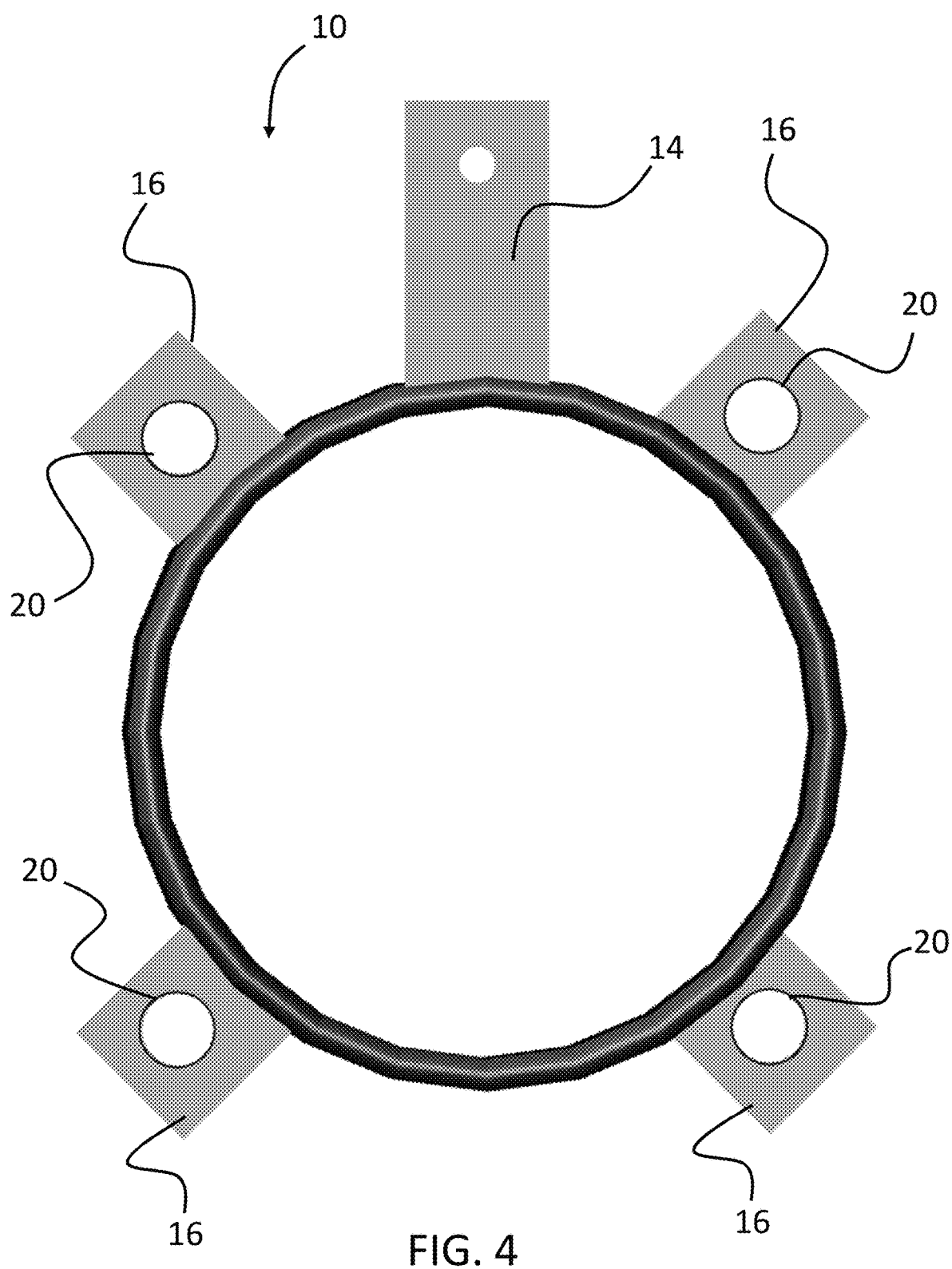
FIG. 4 schematically illustrates a top view of the sample product of FIG. 1.
Figure 5:
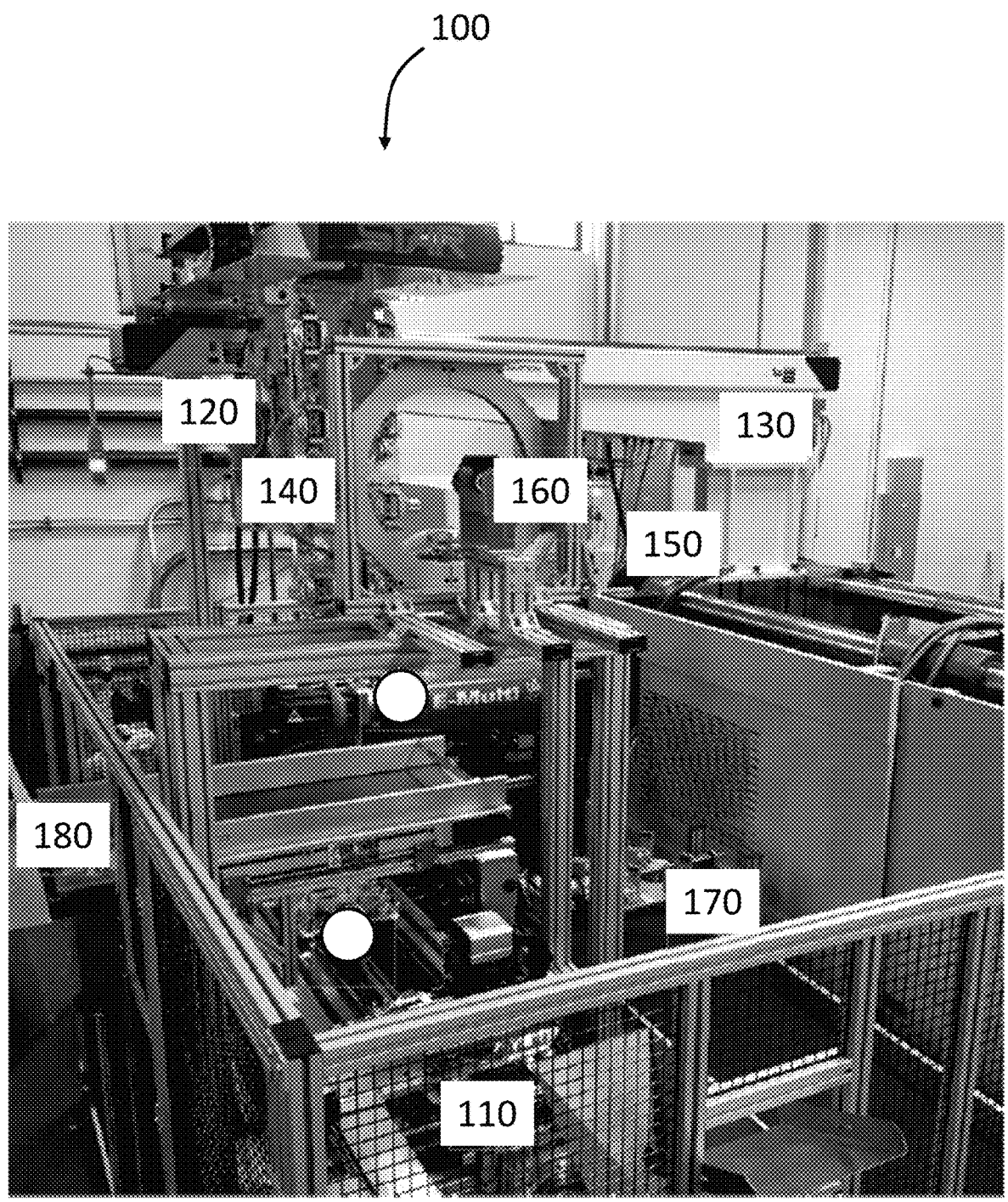
FIG. 5 is a photograph of an exemplary manufacturing cell as described herein.
Figure 6:
FIG. 6 is another photograph of an exemplary manufacturing cell as described herein.
Figure 7:
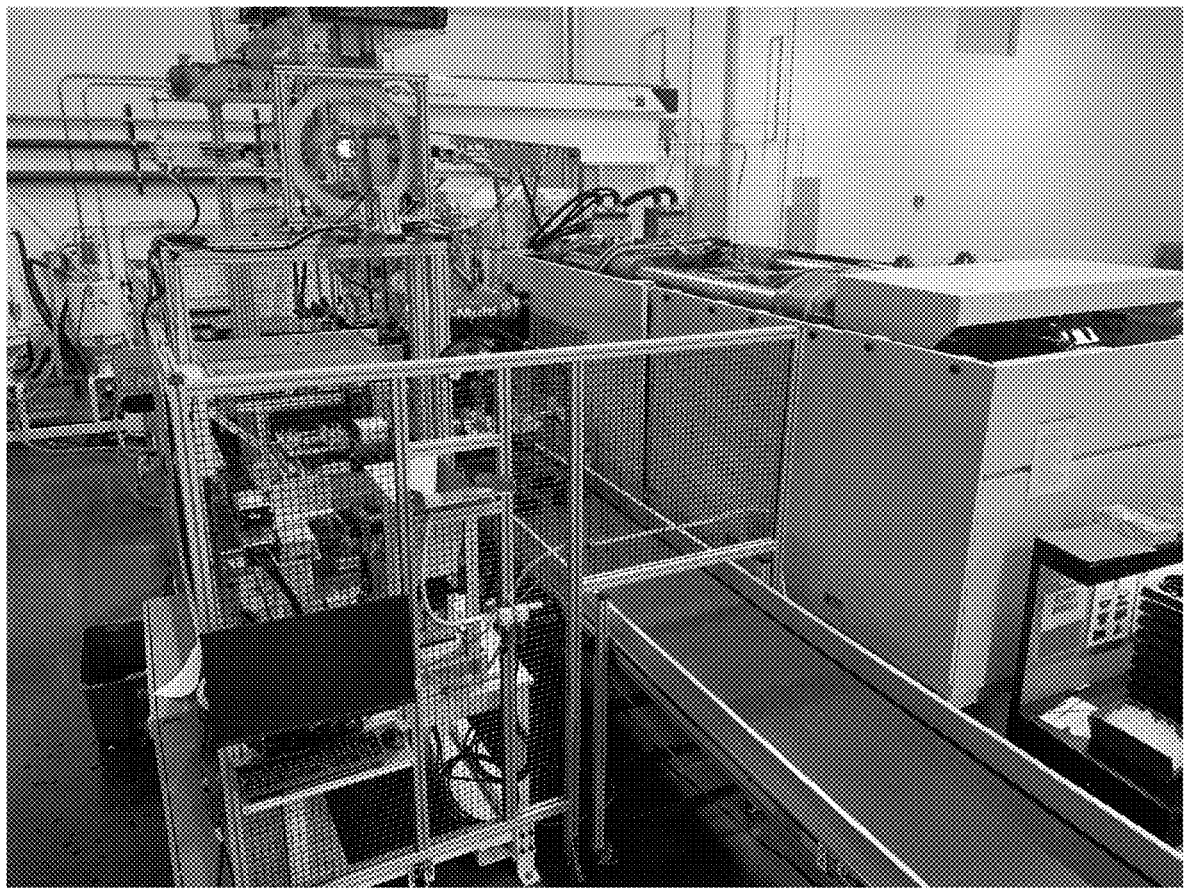
FIG. 7 is another photograph of the exemplary manufacturing cell as described herein.
Figure 8:
FIG. 8 is another photograph of the exemplary manufacturing cell as described herein.
Figure 9:
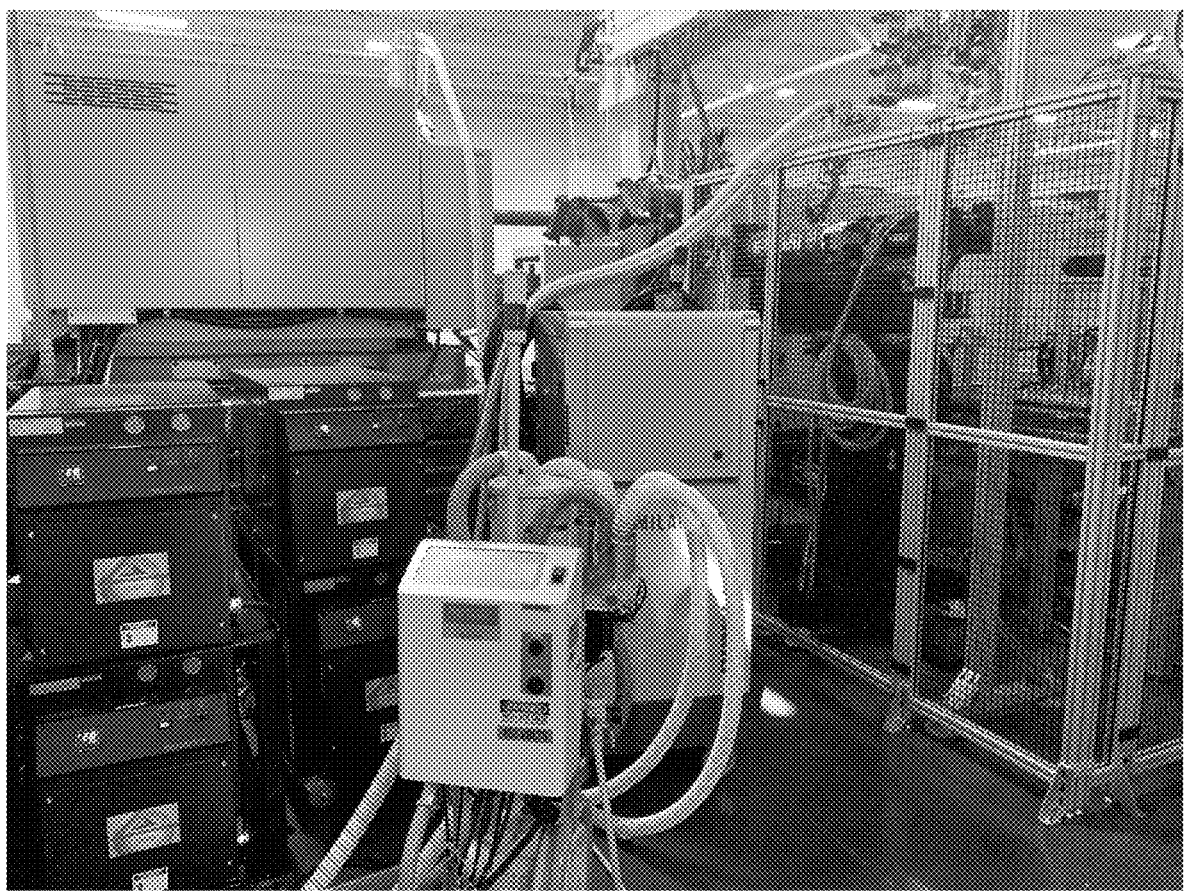
FIG. 9 is another photograph of the exemplary manufacturing cell as described herein.
Figure 10:
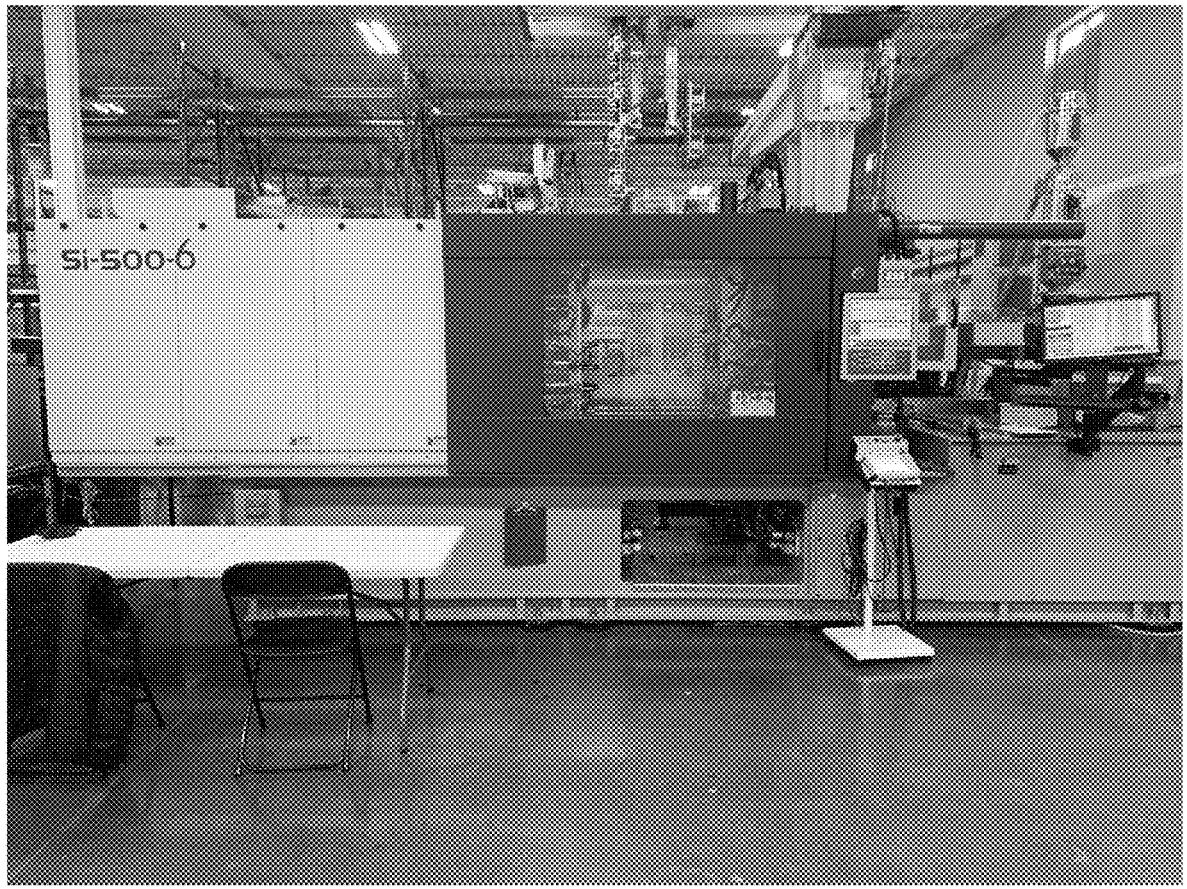
FIG. 10 is another photograph of the exemplary manufacturing cell as described herein.
Figure 11:
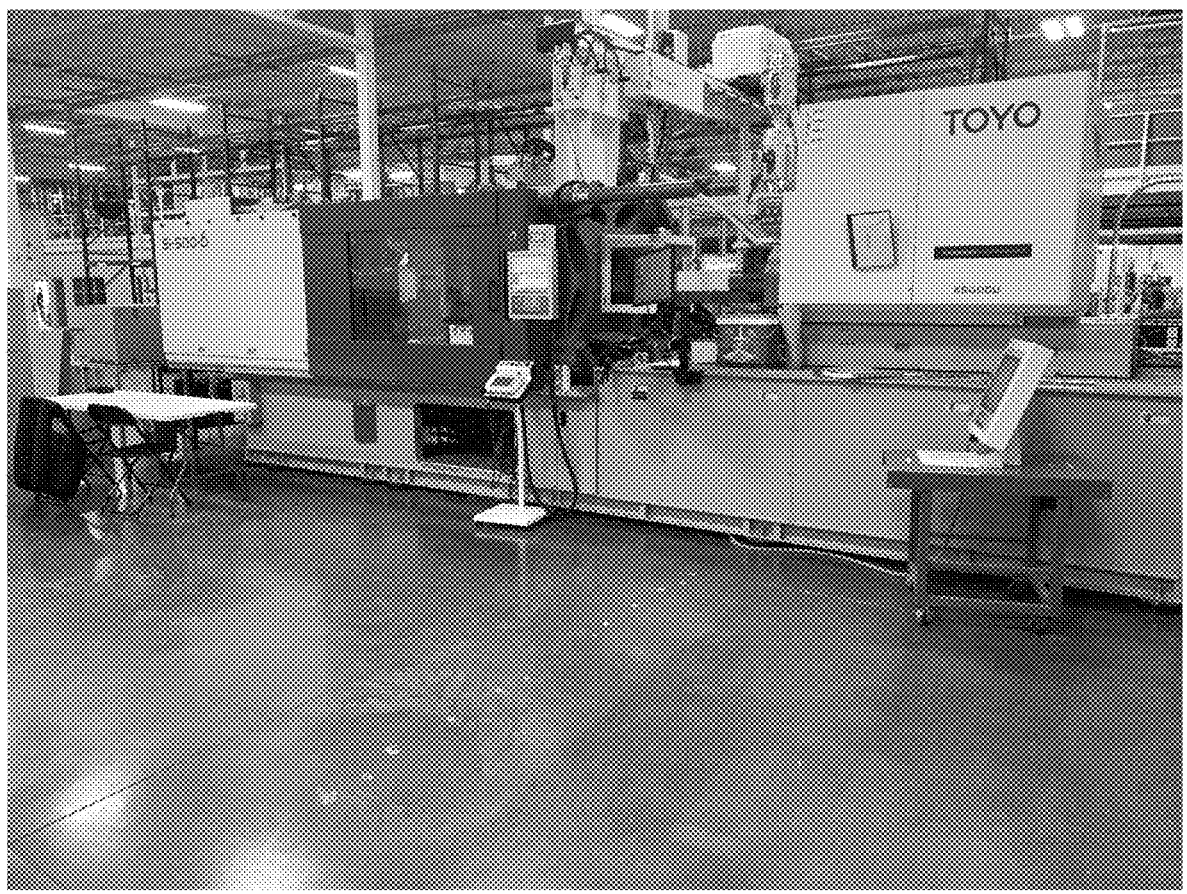
FIG. 11 is another photograph of the exemplary manufacturing cell as described herein.

The exemplary product is an adaptor 10, which is schematically illustrated in FIGS. 1-4. The adaptor 10 includes a first rigid material and a second elastomeric material over-molded onto the first rigid material. Therefore, the process used to manufacture the adaptor 10 includes a two-stage molding process. The adaptor 10 includes a generally cylindrical body 12, with an arm 14 extending from approximately the midpoint of the outside of the cylindrical body 12, and four anchoring tabs 16 positioned equidistantly around the perimeter of the bottom of the cylindrical body 12. As is best illustrated in FIGS. 2 and 3, a connector 18 extends downward from a distal end of the arm 14. The cylindrical body 12, arm 14, anchoring tabs 16, and connector 18 are all fabricated from a rigid polymer. As best illustrated in FIGS. 1 and 4, each anchoring tab 16 includes a cylindrical metal insert 20 positioned generally symmetrically in the anchoring tab 16. Finally, a gasket 22 is formed (over-molded) along the bottom edge of the body 12. The gasket 22 is fabricated from a generally elastomeric material. The gasket 22 can be used to form a seal between the adaptor 10 and another component by positioning the adaptor so that the gasket 22 is in contact with the other component and securing the adaptor 10 to the other component by positioning fasteners through the inserts 20 and into the other component.

As will be appreciated, with prior art manufacturing cells, the adaptor 10 can be challenging to manufacture. Due to its complexity in positioning of the metal inserts and the requirement for two molding steps, the adaptor can be prone to errors. As an initial matter, the four inserts must be picked and positioned correctly prior to the first molding process and must retain their specific position during the second molding process. The geometry of the adaptor 10 can lead to short shots or other defects, such as a poorly formed connector 18 during the molding or an insufficient over-mold of the gasket. Additionally, using a sampling inspection process can lead to defective products shipped to customers, which will require replacement and other mitigation costs along with dissatisfaction among the customer base.

An exemplary manufacturing cell 100 is depicted in photographs shown in FIGS. 5-11. As noted above, the manufacturing cell 100 will be described in relation to the molding process used to manufacture the previously described exemplary product—the adaptor 10. Generally, the manufacturing process begins with the steps of sorting the metal inserts 20 and staging the metal inserts 20; the staged metal inserts are then loaded into the first-shot mold; the two-shot, two-material molding process is completed; each finished adaptor 10 are inspected in an automated process; and the conforming adaptors 10 are packaged for delivery to customers. Any non-conforming adaptors 10 are rejected and removed from the manufacturing process to be scrapped or reworked.

More details regarding the components, subsystems, and structure of the manufacturing cell will be provided herein. However, as a high-level description, the manufacturing cell 100 includes: an insert selection robot 110 that controls an insert loading arm 120; an insert verification system; a nest transfer robot 130 that controls a transfer and extract arm 140; a two-shot injection mold machine 150; an automated inspection station 160; a first conveyor system 170 for transferring products that pass inspection to the packaging area; and a second conveyor system 180 for removing products that fail inspection from the manufacturing and packaging process. The process of manufacturing adaptors 10 includes the use of a pair of nests attached to the end of the transfer and extract arm 140. Such nests can also be referred to as an end of arm tool ("EOAT"). Each of these nests is arranged to grasp and hold four adaptors and are programed to load inserts into the two-shot mold machines, transfer the adaptors 10 from the first shot section of the mold machine to the second shot section of the mold machine, move the adaptors to the inspection station, and after inspection place the adaptors on the first and second conveyors depending on the results of the inspection of each adaptor.

Figure 12:
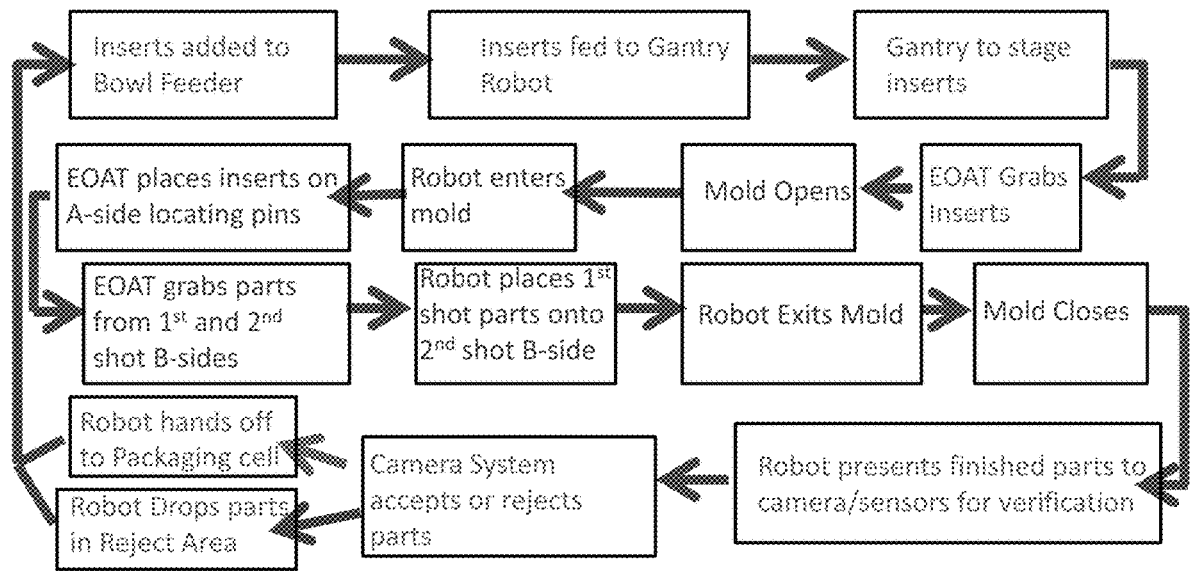
FIG. 12 is a flow diagram depicting an exemplary manufacturing process used with the manufacturing cell described herein.

FIG. 12 illustrates a flow chart of the manufacturing process used with the manufacturing cell 100. As illustrated, the initial step is that metal inserts are placed in a bowl feeder, and the inserts are fed to the insert loading arm of the insert selection robot. The insert loading arm collects four inserts and deposits the inserts in a staging area spaced appropriately for proper location of the metal inserts within the adaptor. Once the inserts are staged, the nest transfer robot moves the transfer and extract arm to the staged inserts and the first nest collects the four staged inserts. The nest transfer robot then moves the transfer and extract arm to the injection mold machine to coincide with the injection mold machine opening between its molding cycles. When the mold is open, the transfer and extract arm moves the nests into the open mold machine and the first nest places the four inserts on location pins on a first side of the first shot section of the mold machine. The nests are then moved toward the second side of the mold, where the first nest removes partially completed adaptors from the second side of the first shot section of the mold machine, and the second nest removes completed adaptors from the second side of the second shot section of the mold machine. The nests are rotated 180 degrees, and the first nest places the partially completed adaptors into the second side of the second shot section of the mold machine. The nest transfer robot then moves the transfer and extract arm out of the injection mold machine. The injection molding machine closes, and it continues its molding operation with the newly positioned metal inserts in the first shot section of the mold and partially completed adaptors in the second shot section of the mold.

The nest transfer robot then moves the transfer and extract arm to the inspection station, and each finished adaptor is inspected individually. The inspection process is complex and thorough. The inspection station components include cameras, multiple light sources, and sophisticated software to compare photographic results with expected dimensional standards for the adaptor. The inspection process involves four distinct inspections of four critical features of the adaptor, including determining presence and location of inserts, determining the location and completeness of the gasket (i.e., a successful second shot over-mold), determining if the part is incomplete (i.e., no short shot), and determining if connector is complete and fully formed.

The inspection begins when the nest transfer robot moves the transfer and extract arm (and thus, the nests) into a position indexed for inspection of the first adaptor. A first white light flash is initiated and a statically positioned camera captures an image of the adaptor. The image is analyzed to insure that the first adaptor is in the expected and proper location. If the first adaptor is not in the expected and proper location, the position of the first adaptor is changed based on the results of the analysis. The location of the adaptor is then checked again. This process is repeated until the first adaptor is properly located. A red light flash is then initiated and a camera captures an image of the adaptor. The image is analyzed to check if the adaptor is fully formed (i.e., no short shot) and to check for the presence and location of each of the four metal inserts. The silhouette of the adaptor is compared to expected dimensions and other visual characteristics to determine if the adaptor is fully formed. The visual contrast between the metal insert and the polymer anchor tabs is used to determine if the inserts are present and property located. The final inspection step is to flash white light from behind the adaptor and capture an image of the connector with a camera to ensure that the connector is fully formed. Once the first adaptor is fully inspected, the nest transfer robot moves the transfer and extract arm into a position indexed for inspection of the second adaptor. The process described above is performed to inspect the second adaptor. The same process is subsequently completed for the third and fourth adaptors, and the inspection is completed.

Once all four adaptors are inspected, the nest transfer robot moves the transfer and extract arm (and thus, the nests) over the first conveyor and places the adaptors that passed inspection on the conveyor for transfer to the packaging area. The nest transfer robot then moves the transfer and extract arm and nests over the second conveyor and places any rejected adaptors on the second convey to remove them from the manufacturing process and make sure such adaptors are not sent to customers. It will be understood that the manufacturing cell maintains and analyzes the inspection data and information so that it can provide statistics, data, and other information regarding the manufacturing process so that personnel managing the process can ascertain rejection rates and additional information useful in continuous improvement of the manufacturing process. Furthermore, if the rejection rate spikes to above the statistical average rejection rate, the inspection system can shut down the manufacturing process and/or send alerts to responsible personnel, who can react to cure or mitigate the situation.

As noted above, the manufacturing cell and manufacturing processes disclosed herein provides an efficient manufacturing process that lowers costs and increases quality of finished products. A traditional manufacturing cell producing an adaptor requires two injection molding machines and six workers to run and monitor the manufacturing process. Traditional manufacturing cells would use a first molding machine to form the majority of the adaptor from the first rigid polymeric material and a second molding machine to over-mold the elastomeric gasket to complete the adaptor. Traditional manufacturing cells would require a worker to handle and place the inserts, an operator for the first molding machine, a worker to inspect the placement and presence of the four adaptors after the first molding step to ensure the adaptor is not defective, an operator for the second molding machine, a worker to inspect the finished adaptor, and a worker to package the adaptors for shipment. In the manufacturing cell described herein, the operation can run with no workers. Alternatively, one worker can be present for cell logistics. Such a worker could manage multiple manufacturing cells at one time. It will be appreciated that the novel manufacturing cell disclosed herein saves a significant amount of money in labor costs.

In addition to lowering labor costs, a fully automated process standardizes cycle time and eliminates the variability that persists when workers are actively participating in the manufacturing process. For example, for the process described herein, the first shot cycle time is approximately 45 seconds, and the second shot cycle is approximately 25 seconds. However, because the first shot cycle and the second shot cycle are coordinated and performed at the same time, there is efficiency gained in this process. When the loading of the inserts and the inspection are included, the total cycle time for the adaptors is a consistent 54 seconds.

One of the most important improvements achieved by the manufacturing cell disclosed herein is that 100 percent of the adaptors are inspected. This is a vast improvement over traditional sampling methods of inspection, where only a few products are inspected and statistics are used to determine if a batch of products are acceptable or rejected. The inspection of all adaptors results in all defective and rejected components being identified and removed from the manufacturing process before such defective products can make it to the packaging stage. As will be appreciated, this nearly eliminates manufacturing defects from affecting the end customer in any way. Such a result yields a more satisfied customer and eliminates the costs of customer returns and replacement and other mitigation costs.

With regard to the manufacturing cell's footprint on the manufacturing floor, the arrangement as disclosed herein takes up approximately a rectangular area of 37 feet by 15.5 feet. Even with a generous 5 foot buffer around the manufacturing cell, it occupies less than half of the footprint a traditional manufacturing cell would occupy. The novel arrangement results in much more efficient and safe use of the manufacturing floor.

An additional system that can be included in the manufacturing cell is a tiered metal insert staging system that includes two insert staging stations. This pair of staging stations can each comprise a platen with four pins (to accommodate four inserts for staging) extending vertically upwards. The platens can be mounted on horizontal rails at two elevations so that the two insert staging stations can slide by each other (being on two different horizontal planes). The platens can be moved back and forth from a position where inserts are loaded onto the pins and a position where the transfer and extraction arm collects the inserts from the pins. In such an arrangement, when one insert staging station is already loaded with inserts and awaiting the transfer and extraction arm, the other insert staging station can be efficiently loaded with metal inserts.

Although not illustrated in the figures, there are a number of further systems that can be automated. For example, the packaging of the final products can be automated, as can the feeding of raw material to the injection molding machine, and the loading of inserts into the bowl feeder. In such an arrangement, the manufacturing cell can operate unattended for long periods of time with downtime limited to either scheduled or unscheduled maintenance. It will be appreciated that such automation substantially lowers costs of operating the manufacturing cell, leading to lower cost products for customers and end users.

The foregoing description of examples has been presented for purposes of illustration and description. It is not intended to be exhaustive or limiting to the forms described. Numerous modifications are possible in light of the above teachings. Some of those modifications have been discussed, and others will be understood by those skilled in the art. The examples were chosen and described in order to best illustrate principles of various examples as are suited to particular uses contemplated. The scope is, of course, not limited to the examples set forth herein, but can be employed in any number of applications and equivalent devices by those of ordinary skill in the art.

What is claimed is:

1. A method of inspecting a manufactured component comprising the following steps:

positioning a component for inspection;

initiating a first flash of light and directing said first flash of light toward the component;

capturing a first image of the component with one of a plurality of cameras during the first flash of light;

analyzing the image of the component and determining if the component is positioned at a location where an inspection can be conducted;

if the component is not in a location where an inspection can be conducted, the component is moved to a position where the inspection can be conducted;

initiating a second flash of light and directing said second flash of light toward the component;

capturing a second image of the component with one of a plurality of cameras during the second flash of light;

comparing the second image to stored information to determine if the component is geometrically fully formed;

analyzing the second image to determine if one or more inserts are present in the component;

initiating a third flash of light and directing said third flash of light toward the component;

capturing a third image of the component with one of a plurality of cameras during the third flash of light;

comparing the third image to stored information to determine if the component is geometrically fully formed;

determining if the component meets a specification for the component;

directing the component to a first location if it is determined that the component does not meets the specification for the component; and directing the component to a second location if it is determined that the component does meet the specification for the component.

2. The method of inspection of claim 1, wherein the first flash of light is white light.

3. The method of inspection of claim 1, wherein the second flash of light is red light.

4. The method of inspection of claim 1, wherein the third flash of light is white light.

5. The method of inspection of claim 1, wherein the camera used to capture the first image and the camera used to capture the second image are the same camera.

6. The method of inspection of claim 1, wherein when the first flash of light is directed to the component from generally the same side of the component as the location of the camera capturing the first image.

7. The method of inspection of claim 1, wherein when the second flash of light is directed to the component from generally the same side of the component as the location of the camera capturing the second image.

8. The method of inspection of claim 1, wherein when the third flash of light is directed to the component from generally the opposite side of the component as the location of the camera capturing the third image.

9. The method of claim 1, wherein the analysis of the second image to determine if one or more inserts are present in the component is performed by analyzing visual contrasts between materials in the second image.

* * * * *